(12) United States Patent
Zhang

(10) Patent No.: US 6,232,755 B1
(45) Date of Patent: May 15, 2001

(54) SWITCHING VOLTAGE REGULATOR THAT ADJUSTS A TIMING IN RESPONSE TO A LOAD TRANSIENT

(75) Inventor: Michael T. Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/495,277

(22) Filed: Jan. 31, 2000

(51) Int. Cl.[7] .................................................. G05F 1/40

(52) U.S. Cl. ......................... 323/282; 323/284; 323/285

(58) Field of Search .................................. 323/282, 283, 323/284, 285, 286, 222, 224; 363/71, 80, 86, 21, 16

(56) References Cited

U.S. PATENT DOCUMENTS 5,477,132 * 12/1995 Canter et al. ....................... 323/282
5,747,976 * 5/1998 Wong et al. ........................ 323/282

* cited by examiner

Primary Examiner—Peter S. Wong
Assistant Examiner—Rajnikant D. Patel
(74) Attorney, Agent, or Firm—Trop, Pruner & Hu, P.C.

(57) ABSTRACT

A method includes energizing and de-energizing at least one inductor to furnish an output power. An indication of the output power is monitored to detect when a transient occurs in the output power. The energizing and de-energizing are performed at a predetermined frequency when the transient is not detected; and in response to the detection of the transient, the energizing and de-energizing are performed at a frequency that deviates from the predefined frequency to compensate for the transient.

21 Claims, 7 Drawing Sheets

SWITCHING VOLTAGE REGULATOR THAT ADJUSTS A TIMING IN RESPONSE TO A LOAD TRANSIENT

BACKGROUND

The invention generally relates to a voltage regulator, such as a switching voltage regulator, that adjusts a timing in response to a load transient.

A DC-to-DC voltage regulator typically is used to convert a DC input voltage to either a higher or a lower DC output voltage. One type of voltage regulator is a switching regulator that is often chosen due to its small size and efficiency. The switching regulator typically includes one or more switches that are rapidly opened and closed to transfer energy between an inductor (a stand-alone inductor or a transformer, as examples) and an input voltage source in a manner that regulates the output voltage.

As an example, referring to FIG. 1, one type of switching regulator is a Buck switching regulator 10 that receives an input DC voltage (called $V_{IN}$) and converts the $V_{IN}$ voltage to a lower regulated output voltage (called $V_{OUT}$) that appears at an output terminal 11. To accomplish this, the regulator 10 may include a switch 20 (a metal-oxide-semiconductor field-effect-transistor (MOSFET), for example) that is operated (via a voltage called $V_{SW}$) in a manner to regulate the VOUT voltage, as described below.

Referring also FIGS. 2 and 3, in particular, the switch 20 opens and closes to control energization/de-energization cycles 19 (each having a constant duration called $T_S$) of an inductor 14. In each cycle 19, the regulator 10 asserts, (drives high, for example) the $V_{SW}$ voltage during an on interval (called $T_{ON}$) to close the switch 20 and transfer energy from an input voltage source 9 to the inductor 14. During the $T_{ON}$ interval, a current (called $I_L$) of the inductor 14 has a positive slope. During an off interval (called $T_{OFF}$) of the cycle 19, the regulator 10 deasserts (drives low, for example) the $V_{SW}$ voltage to open the switch 20 and isolate the input voltage source 9 from the inductor 14. At this point, the level of the $I_L$ current is not abruptly halted, but rather, a diode 18 begins conducting to transfer energy from the inductor 14 to a bulk capacitor 16 and a load (not shown) that are coupled to the output terminal 11. During the $T_{OFF}$ interval, the $I_L$ current has a negative slope, and the regulator 10 may close a switch 21 to shunt the diode 18 to reduce the amount of power that is otherwise dissipated by the diode 18. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the $T_{OFF}$ interval, called a duty cycle, generally governs the ratio of the $V_{OUT}$ to the $V_{IN}$ voltages. Thus, to increase the $V_{OUT}$ voltage, the duty cycle may be increased, and to decrease the $V_{OUT}$ voltage, the duty cycle may be decreased.

As an example, the regulator 10 may include a controller 15 (see FIG. 1) that regulates the $V_{OUT}$ voltage by using a fixed frequency, pulse width modulation (PWM) technique to control the duty cycle. In this manner, the controller 15 may include an error amplifier 23 that amplifies the difference between a reference voltage (called $V_{REF}$) and a voltage (called $V_P$ (see FIG. 1)) that is proportional to the $V_{OUT}$ voltage. Referring also to FIG. 5, the controller 15 may include a comparator 26 that compares the resultant amplified voltage (called $V_C$) with a sawtooth voltage (called $V_{SAW}$) and provides the $V_{SW}$ signal that indicates the result of the comparison. The $V_{SAW}$ voltage is provided by a sawtooth oscillator 25 and may have a constant frequency (i.e., $1/T_S$).

Due to the above-described arrangement, when the $V_{OUT}$ voltage increases, the $V_C$ voltage decreases and causes the duty cycle to decrease to counteract the increase in $V_{OUT}$. Conversely, when the $V_{OUT}$ voltage decreases, the $V_C$ voltage increases and causes the duty cycle to increase to counteract the decrease in $V_{OUT}$. The switching frequency (i.e., $1/T_S$) typically controls the magnitude of an AC ripple component (called $V_{RIPPLE}$ (see FIG. 4)) of the $V_{OUT}$ voltage, as a higher switching frequency typically reduces the magnitude of the $V_{RIPPLE}$ voltage.

The regulator 10 may be part of a computer system and thus, may be used to provide power to components, such as a microprocessor, of the computer system. Because of the ever-increasing operating frequency and power requirements of the microprocessor, the microprocessor may consume a significant amount of power. When the power that is demanded by the microprocessor suddenly increases, giving rise to a transient condition, the voltage that is supplied by the regulator 10 may tend to decrease below an acceptable range of voltages. To prevent this from occurring, the computer system may include a significant amount of decoupling capacitors (not shown) to prevent the voltage that supplies the microprocessor from substantially decreasing when the output load of the regulator 10 suddenly changes. Without the decoupling capacitors, the voltage supplied to the microprocessor may drop below an acceptable level due to the above-described PWM control. In this manner, when a significant load transient occurs, the control scheme may be within a dead time interval, a time interval in which the switch 20 is open, thereby preventing energy from being transferred from the input source 9 to counteract the transient. In general, the response of the regulator 10 to a load transient is a function of the inductance of the inductor 14. Although the current in the inductor 14 cannot change instantaneously when the switch 20 closes, in general, the smaller the inductance of the inductor 14, the faster the regulator 10 may respond to counteract the transient. However, if the control scheme is within the dead interval, an additional time elapses in which the regulator 10 cannot respond to the transient.

For example, referring to FIGS. 6 and 7, the controller 15 (see FIG. 1) may generate pulse width modulated pulses 30 (via the $V_{SW}$ signal) to regulate the $V_{OUT}$ voltage for a given level (called $I_{CC-MIN}$) of output current (called $I_{OUT}$) of the regulator 10. At time $T_3$, the pulse 30a may end, thereby causing the switch 20 to open at time $T_3$. However, also at time $T_3$, the $I_{OUT}$ current may transition from the $I_{CC-MIN}$ level to a higher current level (called $I_{CC-MAX}$). The controller 15 may not close the switch 20 until another switching cycle begins (and until another pulse 30b is generated) at time $T_4$. Therefore, a dead time interval 32 may occur in which the switch 20 is open, a state of the regulator 10 that prevents the regulator 10 from immediately responding to the increased load.

The duration of the dead interval 32 may be reduced by coupling two of the regulators 10 in parallel and operating their switches 20 in a complementary fashion. However, this arrangement may also not respond fast enough to prevent a significant drop in the regulator's output voltage.

Thus, there is a continuing need for a switching regulator having an improved response to load transients.

DETAILED DESCRIPTION

Figure 1:
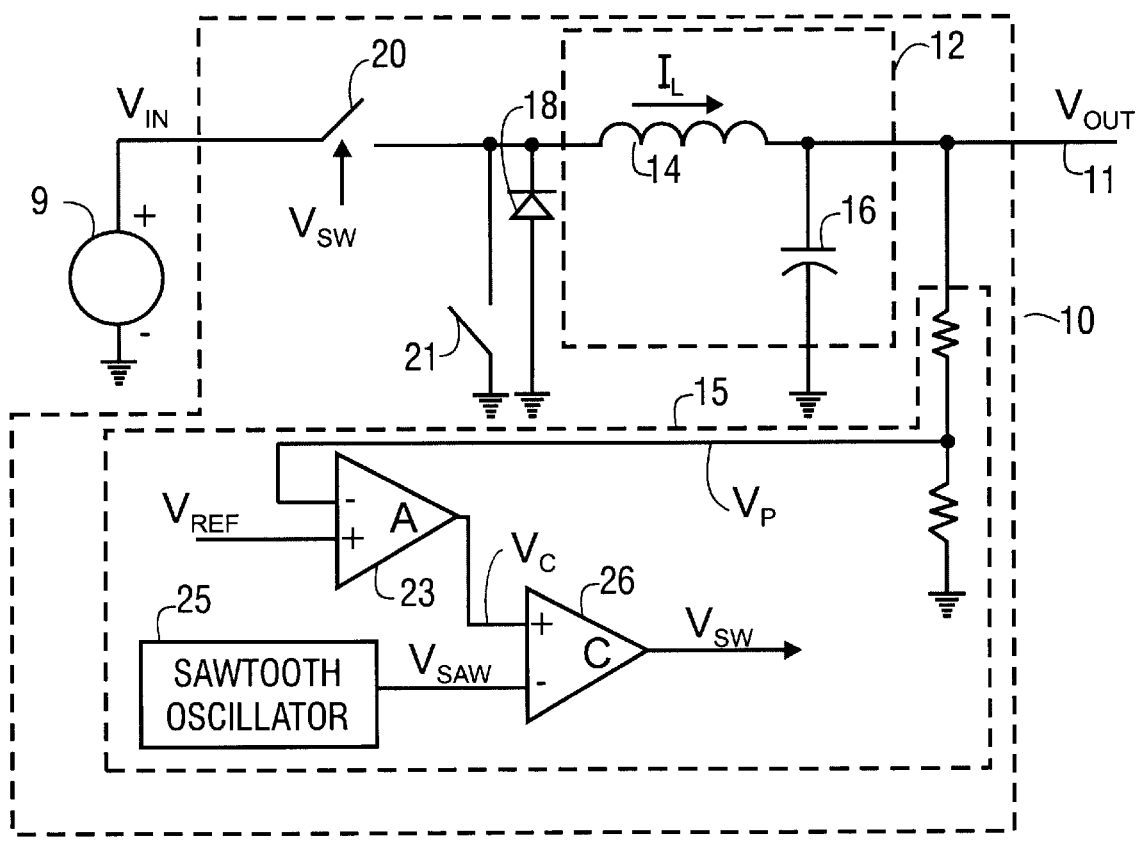
FIG. 1 is a schematic diagram of a switching voltage regulator of the prior art.
Figure 2:
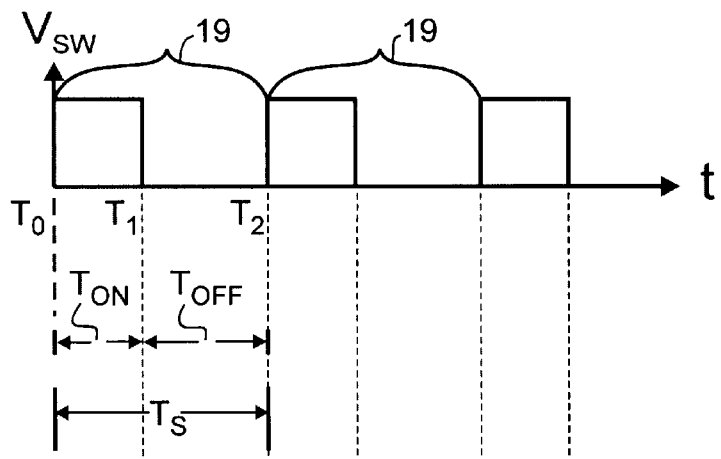
FIGS. 2, 3, 4, 5, 6 and 7 are current and voltage waveforms that illustrate operation of the regulator of FIG. 1.
Figure 3:
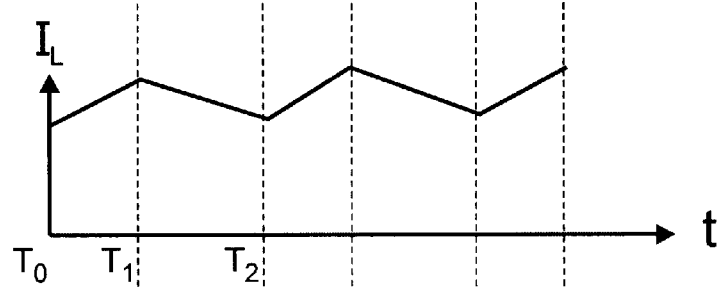
Figure 4:
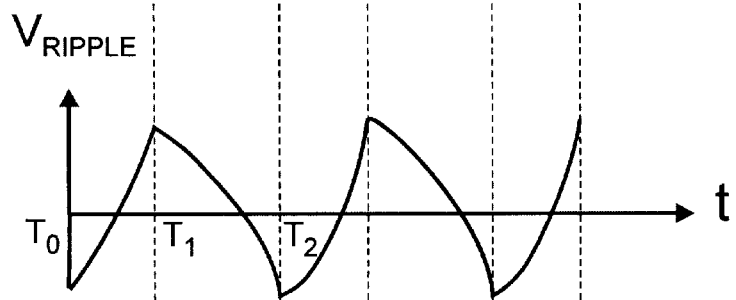
Figure 5:
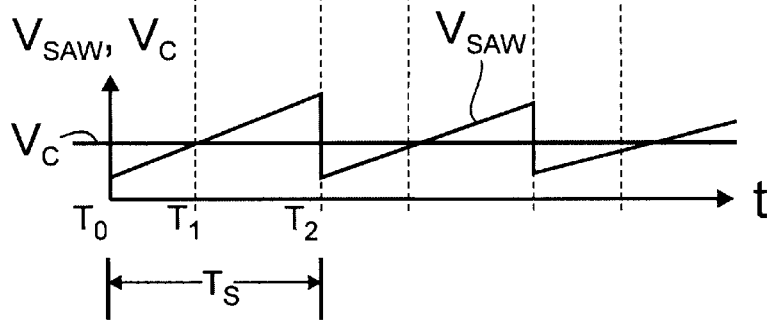
Figure 6:
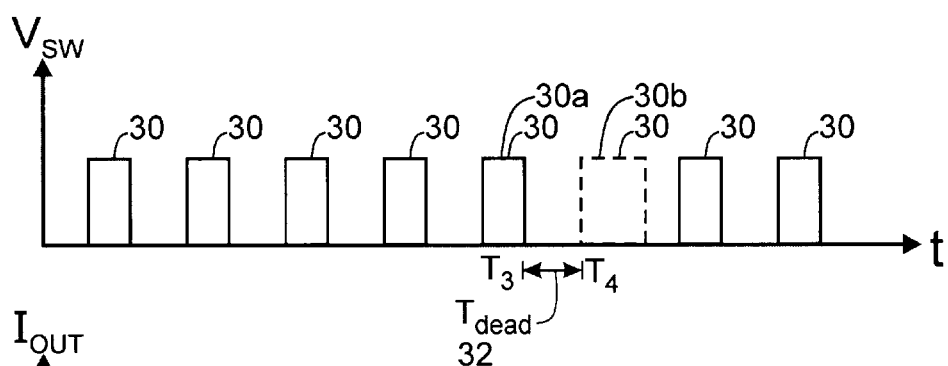
Figure 7:
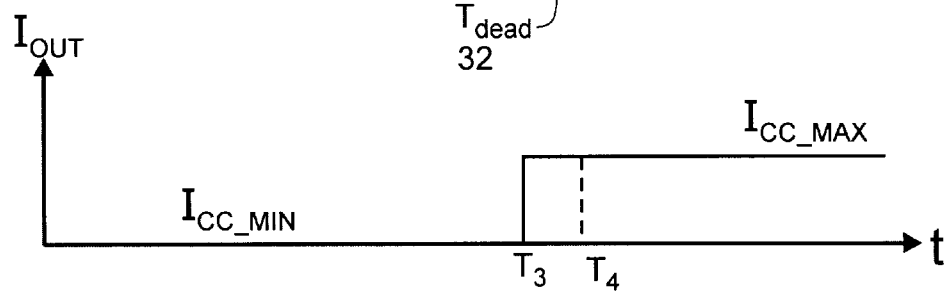
Figure 8:
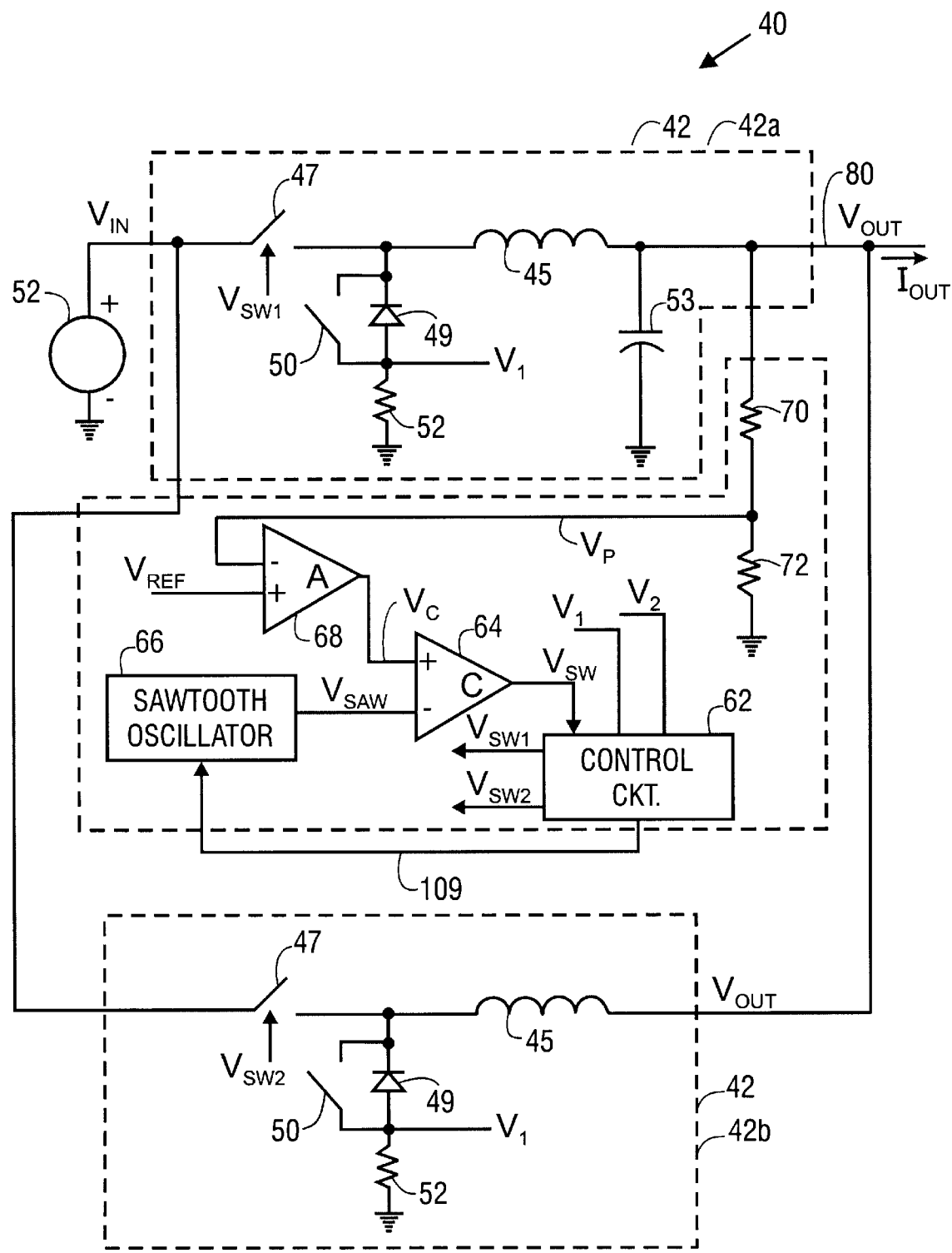
FIG. 8 is a switching voltage regulator according to an embodiment of the invention.

Referring to FIG. 8, an embodiment 40 of a switching voltage regulator in accordance with the invention includes two Buck switching regulator stages 42a and 42b (each having a similar design denoted by the reference numeral "42") that are coupled together in parallel to convert an input voltage (called "VIN") into an output voltage (called $V_{OUT}$). In this manner, the stages 42a and 42b each receive the $V_{IN}$ input voltage from a voltage source 52 and regulate the $V_{OUT}$ voltage that appears at an output terminal 80 that is common to both of the stages 42a and 42b. The stages 42a and 42b also share a controller 60 (as described below) and a bulk capacitor 53 that is coupled between the output terminal 80 and ground.

More particularly, in some embodiments of the invention, each stage 42 includes a switch 47 (a metal-oxide-semiconductor field-effect-transistor (MOSFET), for example) that is coupled between the positive terminal of the voltage source 52 and a terminal of an inductor 45. The other terminal of the inductor 45 is coupled to the output terminal 80. For the stage 42a, the switch 47 is closed and opened by a signal called $V_{SW1}$, and for the stage 42b, the switch 47 is closed and opened by a signal called $V_{SW2}$. For each stage 42, the closing of the switch 47 causes energy to be transferred from the source 52 and stored in the inductor 45 to energize the inductor 45, and the opening of the switch 47 causes the stored energy to be transferred from the inductor 45 to the output terminal 80, a transfer that de-energizes the inductor 45.

In some embodiments of the invention, the controller 60 generates the $V_{SW1}$ and $V_{SW2}$ signals in a manner that, in general, causes the on times (the times in which the switch 47 conducts, or is closed) of the two switches 47 to be shifted 180° apart. In other embodiments of the invention, the regulator may be a multiphase regulator other than a two phase regulator, and in these embodiments, the controller 60 may generate signals to control the operation of the stages so that the switch control signals have the proper phase relationship. As examples, for a three phase regulator, the switch control signals are 120° apart, for a four phase regulator, the switch control signals are 90° apart, etc.

For the two phase design (assumed in the description below unless otherwise noted), the $V_{SW1}$ signal includes pulses 90 (see FIG. 9), each of which has a duration that sets the on time of a particular switching cycle of the stage 42a and appears at a predefined switching frequency.

Similarly, the $V_{SW2}$ signal includes pulses 94 (see FIG. 10), each of which has a duration that sets the on time of a particular switching cycle of the stage 42b and appear at a predefined switching frequency. Furthermore, the pulses 94 are generally shifted 180° with respect to the pulses 90. Assuming no transients occur, the controller 60 generates the pulses 90 at a predefined switching frequency; generates the pulses 94 at a predefined switching frequency; and regulates the $V_{OUT}$ voltage by adjusting the duty cycles of the $V_{SW1}$ and $V_{SW2}$ signals.

Due to the phase shift between the pulses 90 and 94 that is introduced by the controller 60, a ripple noise component of the $V_{OUT}$ signal may be substantially minimized because the ripple currents that are contributed by each stage 42 are 180° out of phase. Furthermore, the frequency of the ripple noise component is twice the switching frequency of the stages 42, thereby permitting the use of a smaller capacitor 53 than would otherwise be used without the frequency doubling.

Figure 9:
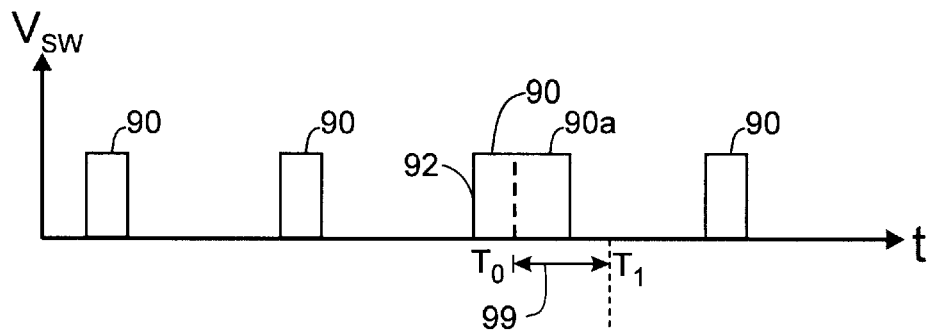
FIGS. 9, 10, 11, 12, and 13 depict waveforms illustrating operation of the regulator of FIG. 8 according to different embodiments of the invention.
Figure 10:
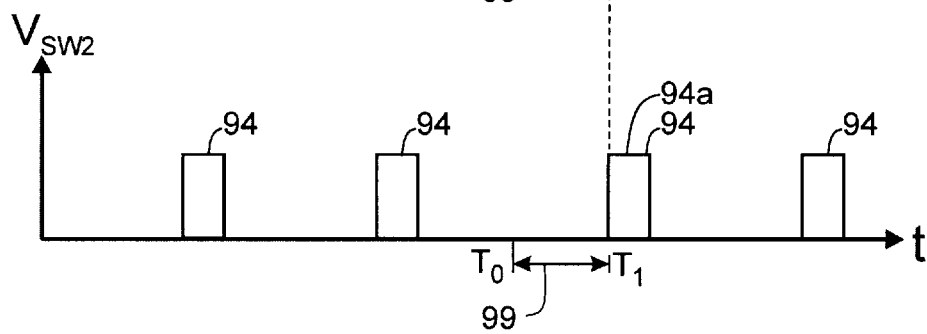
Figure 13:
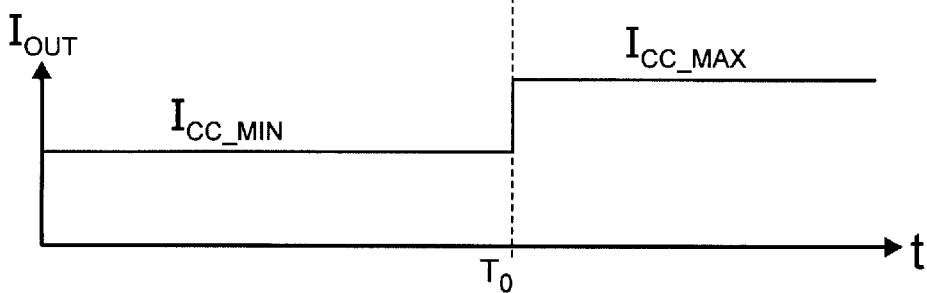

Although the regulator 40 has an effective switching frequency that is approximately twice the switching frequency of either stage 42, the regulator 40 may still not respond quickly enough to a sudden change (i.e., a transient) in the power that is demanded by a load of the regulator 40 if not for the features described below. For example, FIGS. 9, 10 and 13 depict a possible worst case scenario. In this scenario, at time $T_0$, the output power of the regulator 40 may suddenly increase, as depicted by the increase in the $I_{OUT}$ current level from an $I_{CC\_MIN}$ level to an $I_{CC\_MAX}$ level at time To in FIG. 13. Time $T_0$ is also the time at which the on time of the pulse 90a (see FIG. 9) would normally end. Thus, a dead time interval 99 (see FIGS. 9 and 10) in which the switches 47 of both stages 42 are open may exist between the end of the pulse 90a and the beginning (time $T_1$) of the pulse 94a, if not for the features described below. In a conventional regulator, the regulator may not close a switch to transfer energy from an input source to an inductor during the dead time interval, and thus, in the conventional regulator, additional energy may not be transferred from the input source to counteract the transient.

As described below, for purposes of preventing this from happening, for the scenario described above, the controller 60 begins another on time interval (to extend the on time interval 90a by the additional portion 93) at time $T_0$. In this manner, the controller 60 monitors the output power (as described below) to detect a load transient. When the controller 60 detects a transient, the controller 60 deviates from the predetermined switching frequency to counteract the increase in load, a control technique that departs from the periodic schedule that the controller 60 otherwise follows to generate the $V_{SW1}$ and $V_{SW2}$ signals. Thus, due to this control technique, the switch 47 of the stage 42a has more on time to counteract the transient. As depicted by the example shown in FIG. 9, the on time of the pulse 90a is extended so that the pulse 90 includes a portion 92 due to the non-transient related control and a portion 93 that is attributable to the transient compensation.

Because the occurrence of a transient (such as the transient that is depicted in FIG. 13) may be viewed as a random event, the transient may occur after the occurrence of a pulse 90 and before the occurrence of a pulse 94 (as depicted in FIGS. 9 and 10) or after the occurrence of a pulse 94 and before the occurrence of the pulse 90. However, regardless of the timing of the transient, the controller 60 alters the timing of the appropriate $V_{SW1}$ or $V_{SW2}$ signal to effectively add more on time to counteract the effect of the transient. Thus, if the controller 60 detects a transient after the expiration of one of the pulses 90 and before the next pulse 94, the controller 60 may either (depending on the particular embodiment) create another pulse 90 or 94 ahead of schedule. If the transient occurs during one of the pulses 90 and 94, in some embodiments, the controller 60 does not create additional on time for either switch 47, as one of the switches 47 is closed when the transient occurs. However, in other embodiments, the controller 60 may extend the on time of one of the switches 47 if the transient occurs during one of the pulses 90 and 94.

Figure 11:
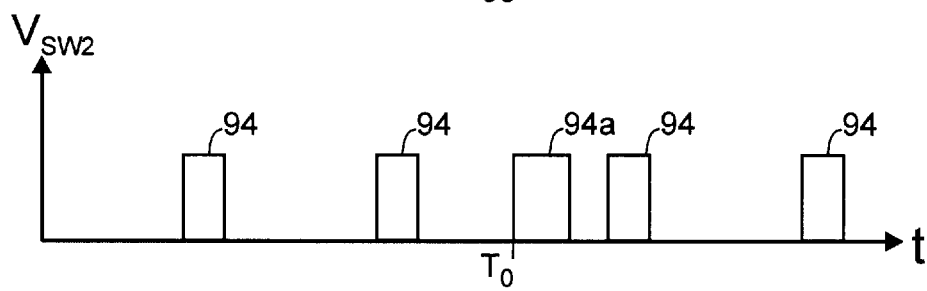

The control scheme that is described above assumes complementary switching of the stages 42a and 42b, i.e., the switch 47 of one stage 42 is open while the switch 47 of the other stage 42 is closed. However, in some embodiments, the controller 60 temporarily switches the converters 42 in parallel to respond to the transient. For example, for the scenario that is depicted in FIGS. 9, 11 and 13, the controller 60, in some embodiments of the invention, may generate the pulse 94a in synchronization with the latter portion 93 of the pulse 90a, beginning at time $T_0$. Thus, due to this arrangement, the source 52 may communicate energy concurrently through both converters 42a and 42b to counteract the transient. As shown, after the pulses 90a and 94a, the controller 60 returns to the above-described complementary switching constant frequency PWM control scheme.

Referring back to FIG. 8, among the other features of each Buck converter stage 42, the stage 42 includes a diode 49 that has its cathode coupled to the inductor terminal that is closest to the switch 47. The anode of the diode 49 is coupled to a current sensing resistor 52 that is coupled between the anode and ground. The resistor 52 of the stage 42a furnishes a voltage (called $V_1$) that indicates the inductor current of the stage 42a, and the resistor 52 of the stage 42b furnishes a voltage (called $V_2$) that indicates the inductor current of the stage 42b. In some embodiments of the invention, each stage 42 includes a switch 50 that is coupled in parallel with the diode 49 and may be used to reduce resistive power losses in the stages 42.

In some embodiments of the invention, the controller 60 regulates the $V_{OUT}$ voltage by using a constant frequency pulse width modulation (PWM) control technique to control the duty cycle of the two switches 47, except when a transient occurs. The control described below is a voltage mode PWM control (except when a transient occurs). However, it is contemplated that in other embodiments of the invention, other control schemes (a current mode control scheme, for example) may be used to control operation of the switches 47 during times in which a transient does not occur.

For the voltage mode control (assumed in the description below unless otherwise noted), the controller 60 may include an error amplifier 68 that amplifies the difference between a reference voltage (called $V_{REF}$) and a voltage (called $V_P$) that is proportional to the $V_{OUT}$ voltage. A comparator 64 of the controller 60 compares the resultant amplified voltage (called $V_C$) with a sawtooth voltage (called $V_{SAW}$) and provides a signal (to a control circuit 62) that indicates the result of the comparison. The $V_{SAW}$ voltage is provided by a sawtooth oscillator 25 and has a constant switching frequency until reset by the controller 60 to cause a deviation from the constant frequency to counteract a transient, as described below.

More particularly, in some embodiments of the invention, the control circuit 62 may monitor the output power of the regulator 40 through the $V_1$ and $V_2$ voltages, each of which indicates the current in a different one of the inductors 45. Of course, the control circuit 62 may use other techniques to monitor the output power. For example, the control circuit 62 may monitor currents through coils that are magnetically coupled to the inductors 45, for example. Regardless of the technique used to monitor the power output of the regulator 40, the control circuit 62 monitors the output power of the regulator 40 to detect a transient in the output power. As an example, the control circuit 62 may compare the measured output current to a predetermined threshold level to identify the occurrence of a transient. If a substantial change in the output current occurs during a predetermined time interval (a switching period, for example) then, in some embodiments, the control circuit 62 deems this to be a transient. A substantial change in the output current may be indicated by the output current surpassing, as examples, an absolute current level or a current level that is a predetermined amount above the output current level that existed before the beginning of the predetermined time interval.

Figure 12:
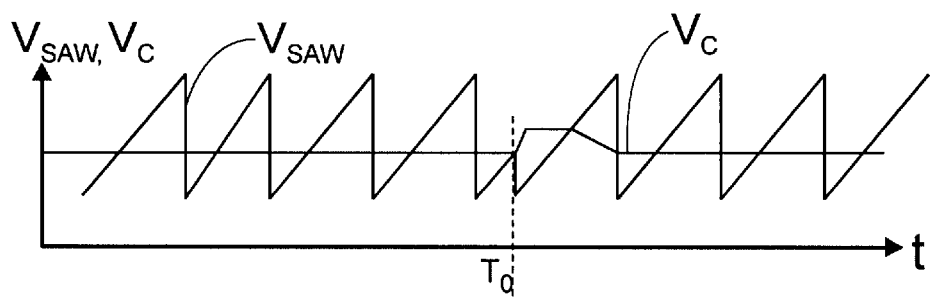

When the regulator 40 does not encounter a transient, the control circuit 62 operates in the following manner. When the comparator 64 asserts (drives high, for example) its output signal, the control circuit 62 pulses either the $V_{SW1}$ or the $V_{SW2}$ signal high to maintain the interleaved switching of the stages 40a and 40b. Thus, as depicted in FIG. 12, for each switching cycle, as long as the $V_C$ voltage is greater than the $V_{SAW}$ signal, the control circuit 62 asserts (drives high, for example) the $V_{SW1}$ or $V_{SW2}$ signal to generate the pulse 90, 94. Otherwise, the control circuit 62 deasserts (drives low, for example) both the $V_{SW1}$ and $V_{SW2}$ signals.

When the control circuit 62 detects a transient, the control circuit 62 responds in the following manner. First, the control circuit 62 determines if one of the switches 47 is already closed. If so, then in some embodiments of the invention, the control circuit 62 takes no further action than the scheduled above-described PWM control, as energy is being communicated from the input source 52 to counteract the transient. Otherwise, if no switch 47 is closed when the transient occurs, the control circuit 62 resets the sawtooth oscillator 66, as depicted in the $V_{SAW}$ (see FIG. 12) signal at time $T_0$. The control circuit's reset of the $V_{SAW}$ signal creates another on time interval for the converter 42 to respond to the transient. In this manner, as depicted in FIG. 12, the $V_C$ voltage may rise after time $T_0$ due to a decrease in the $V_{OUT}$ voltage. However, by resetting the sawtooth oscillator 66, another on time interval is available for one or both (depending on the particular embodiment) of the converters 42 to respond to the transient to keep the $V_{OUT}$ voltage within regulation.

Figure 14:
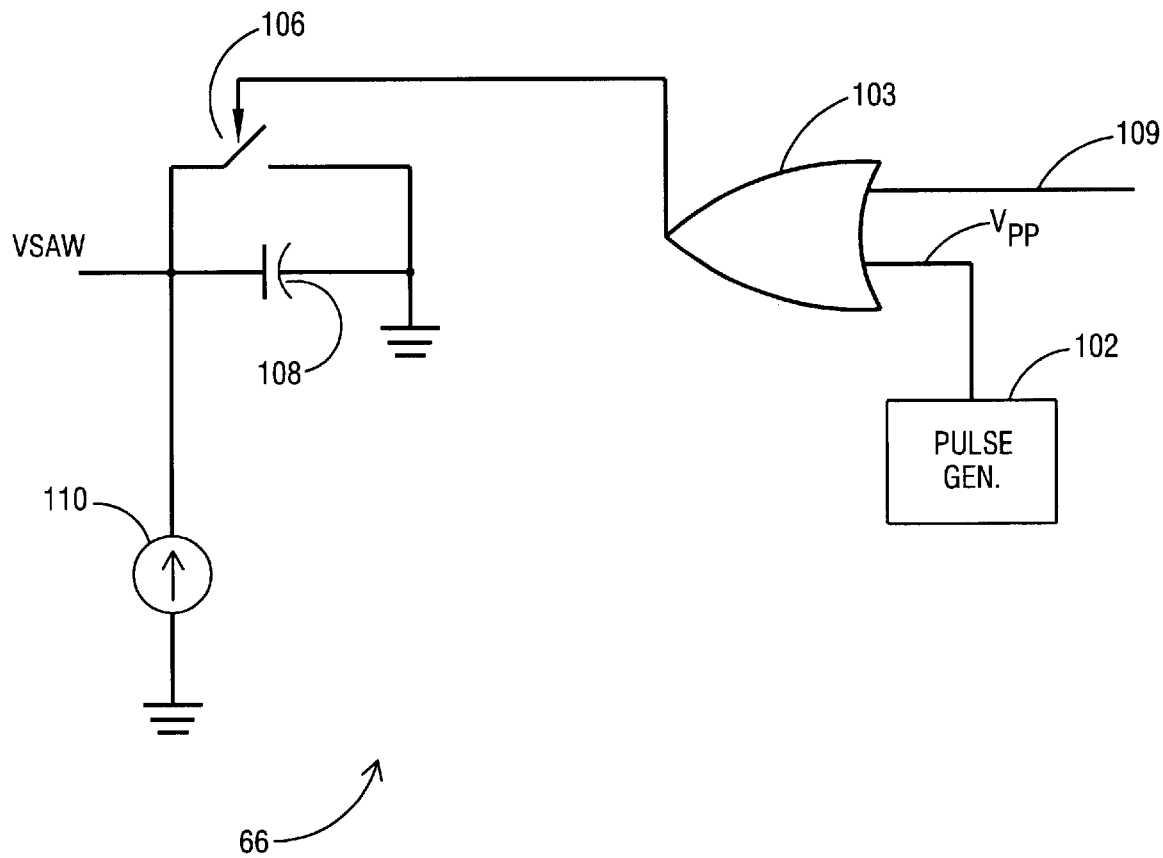
FIG. 14 is a schematic diagram of a sawtooth oscillator of FIG. 8 according to an embodiment of the invention.

Referring to FIG. 14, in some embodiments of the invention, the sawtooth oscillator 66 includes a ramp generator, or integrator, that includes an integrating capacitor 108 that is coupled between ground and a constant current source 110. The $V_{SAW}$ signal is the voltage drop across the capacitor 108. A switch 106 is coupled in parallel with the capacitor 108 and is operated by a pulse generator 102 and the control circuit 62 to create the $V_{SAW}$ signal, as described below.

In this manner, the pulse generator 102 generates a periodic pulse train signal (called $V_{PP}$) that when de-asserted (driven low, for example) permits the $V_{SAW}$ voltage to ramp upward. The $V_{PP}$ signal sets the predefined switching and thus, has a frequency when not transient occurs near the frequency of the $V_{SAW}$ frequency. When the $V_{PP}$ signal is asserted (driven high, for example) due to one of the narrow pulses of the pulse train signal, the switch 106 closes to discharge the capacitor 108 and cause the $V_{SAW}$ voltage to decrease to form one of the vertical edges of the $V_{SAW}$ signal.

The switch 106 is controlled by the voltage that appears on the output terminal of an OR gate 103. One input terminal of the OR gate 103 is connected to a reset line 109 that is coupled to from the control circuit 62, and another input terminal of the OR gate 103 receives the $V_{PP}$ signal. Thus, due to this arrangement, the $V_{PP}$ signal controls the periodic timing of the $V_{SAW}$ and thus, controls the periodic scheduling of the on times for the $V_{SW1}$ and $V_{SW2}$ signals when the regulator 40 is not responding to a transient condition. However, the control circuit 62 may reset the sawtooth generator 66 by asserting (driving high, for example) the reset line 109, an action that closes the switch 106 and resets the ramp generator.

Figure 15:
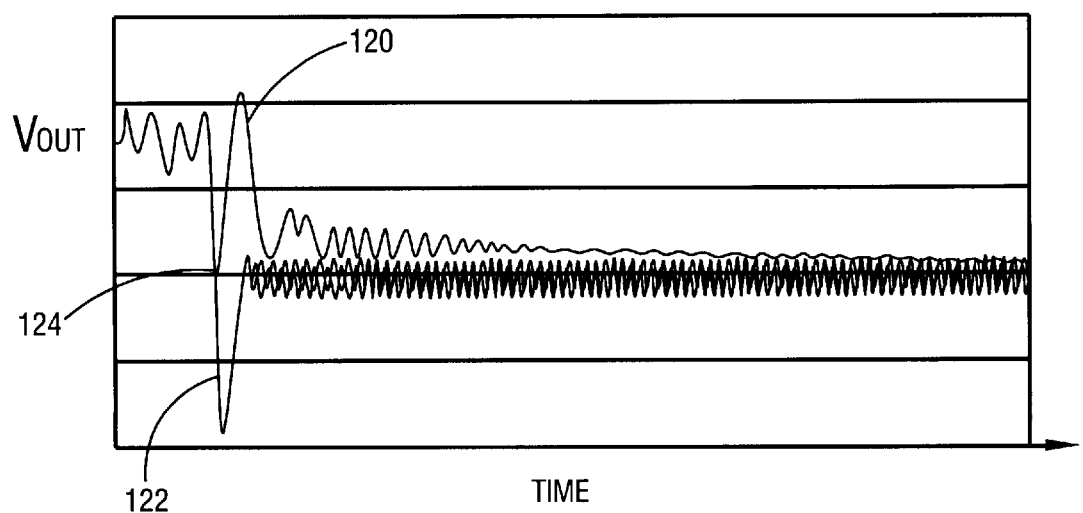
FIG. 15 depicts waveforms illustrating performance of the regulator according to different embodiments of the invention.

Referring to FIG. 15, the in phase and out of phase versions of the above-described circuit were simulated along with a conventional multi-phase parallel regulator that was formed from buck converter stages. The simulation included simulating a transient in the power demand. As shown by a waveform 122, the constant timing approach of the conventional regulator permits a significant voltage drop to occur when a transient occurs. As depicted by the waveform 124, the interleaved approach for the regulator 40 during the transient produces less voltage drop. Finally, as depicted by the waveform 120, the best results may be achieved by the non-interleaved approach for the regulator 42 in which the voltage is prevented from decreasing during the transient.

Figure 16:
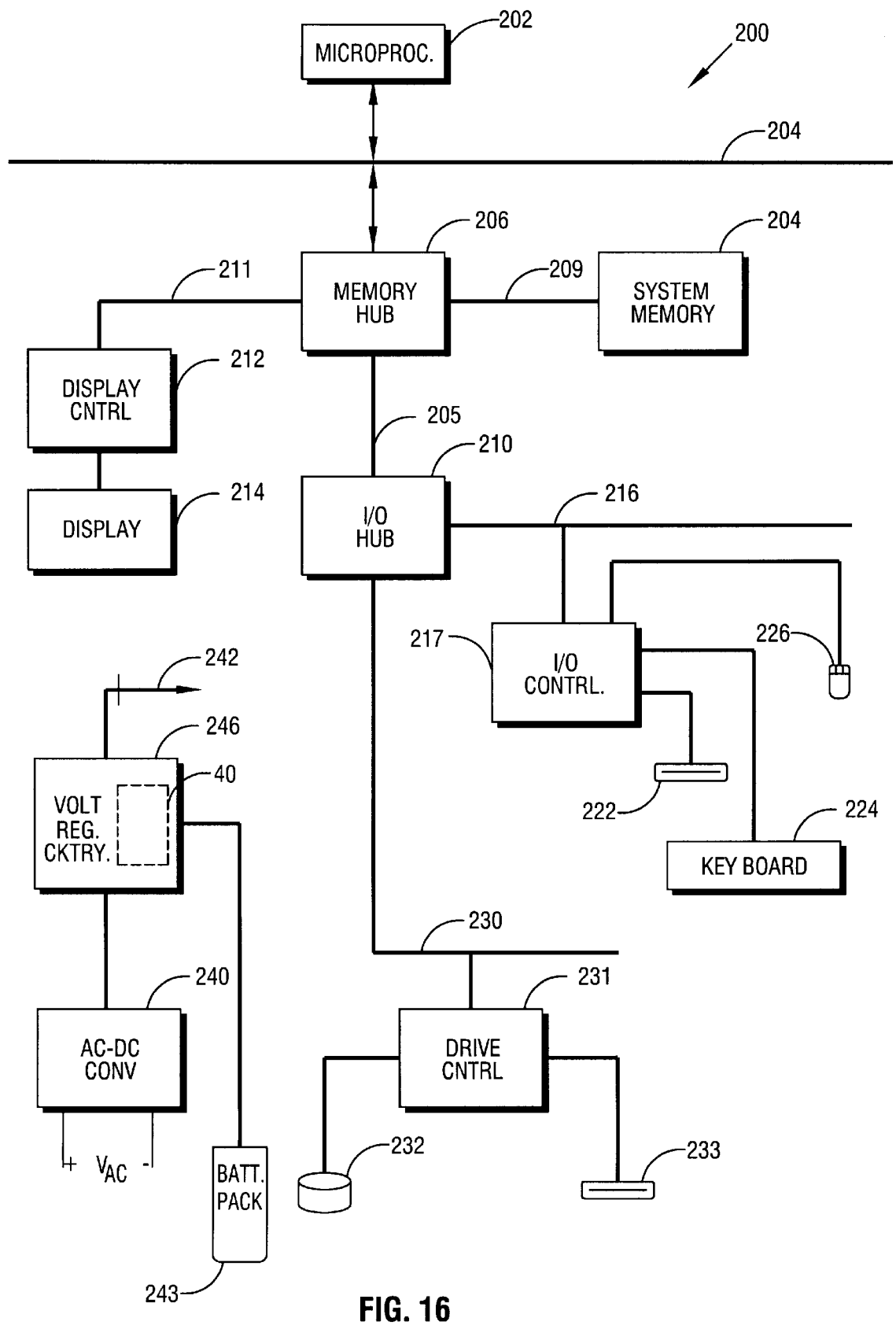
FIG. 16 is a schematic diagram of a computer system according to an embodiment of the invention.

Referring to FIG. 16, the regulator 40 may furnish power to a computer system 200. In this manner, the regulator 40 may be part of voltage regulation circuitry 246 of the computer system 200 and may furnish power to one or more power lines 242. In addition to the voltage regulation circuitry 246, the computer system 200 may also include an AC-to-DC converter 240 that may receive an AC wall voltage and convert the AC voltage into a DC voltage that is provided to the voltage regulation circuitry 246. The voltage regulation circuitry 246 may also receive a DC voltage from a battery pack 243 that furnishes power when AC power is unavailable.

Among the components that consume power and may receive the $V_{OUT}$ voltage, the computer system 200 may include a microprocessor 202 and a bridge circuit, or memory hub 206, both of which are coupled to a local bus 204. The memory hub 206 may interface the local bus 204, a memory bus 209 and an Accelerated Graphics Port (AGP) bus 211 together. The AGP is described in detail in the Accelerated Graphics Port Interface Specification, Revision 1.0, published on Jul. 31, 1996, by Intel Corporation of Santa Clara, Calif. A system memory 208 may be coupled to the memory bus 209, and a display controller 212 (that controls a display 214) may be coupled to the AGP bus 211. A hub communication link 205 may couple the memory hub 206 to another bridge circuit, or input/output (I/O) hub 210.

The I/O hub 210 includes interfaces to an input/output (I/O) expansion bus 216 and a Peripheral Component Interconnect (PCI) bus 230. The PCI Specification is available from the PCI Special Interest Group, Portland, Oregon 97214. An I/O controller 217 may be coupled to the ISA bus 216 and receive input data from a keyboard 224 and a mouse 226, as examples. The I/O controller 217 may also control operations of a floppy disk drive 222. A drive controller 231 may be coupled to the PCI bus 230. The drive controller 231 may control operations of a hard disk drive 232 and a CD-ROM drive 233, as examples.

Other embodiments are within the scope of the following claims. For example, the regulator may be formed from a single Buck converter stage or more than two Buck converter stages in different embodiments of the invention. Furthermore, in other embodiments, a topology (a forward, flyback or a Boost converter topology, as examples) other than a Buck converter topology may be used. A multiple phase converter (three phase or a four phase converter, as examples) other than a two phase converter may be used in other embodiments of the invention. Control schemes, such as a current mode control scheme, may be used other than the voltage mode control scheme that is described above.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A switching regulator comprising:
   at least one inductor;
   at least one switch to energize and de-energize said at least one inductor to furnish an output power; and
   a controller to:
   monitor an indication of the output power to detect when a transient occurs in the output power,
   cause said at least one switch to operate at a predetermined frequency when the controller does not detect the transient, and
   in response to the detection of the transient, cause the operation of said at least one switch to deviate from the predetermined frequency to compensate for the transient.

2. The switching regulator of claim 1, wherein
   when the controller does not detect the transient said at least one switch operates at the predetermined frequency to energize said at least one inductor during on intervals and de-energize said at least one inductor during off intervals, and
   in response to the transient occurs during one of the off intervals, the controller operates said at least one switch to terminate de-energizing of said at least one inductor and begin energizing said at least one inductor.

3. The switching regulator of claim 1, wherein the controller comprises:
   an oscillator to generate a periodic signal;
   a comparator to compare an indication of an output voltage of the switching regulator to the periodic signal; and
   a control circuit coupled to the comparator to control said at least one switch based on the comparison.

4. The switching regulator of claim 3, wherein the control circuit resets the oscillator in response to the detection of the transient.

5. The switching regulator of claim 3, wherein the oscillator comprises a sawtooth oscillator.

6. The switching regulator of claim 5, wherein the control circuit discharges a capacitor of the sawtooth oscillator in response to the detection of the transient.

7. A voltage regulator comprising:
   a first switching regulator circuit to transfer first energy that is stored in the first switching regulator circuit to an output terminal of the voltage regulator during first on time intervals and store the first energy during first off time intervals;
   a second switching regulator circuit to transfer second energy that is stored in the second switching regulator circuit to the output terminal during second on time intervals and store the second energy during second off time intervals; and a controller coupled to the first and second switching regulator circuits to:
monitor an indication of an output power of the voltage regulator to detect when a transient occurs in the output power,
interleave the first and second on time intervals in time at least when the controller does not detect the transient,
cause the first and second on time intervals to occur at a predetermined frequency, and
in response to the detection of the transient, cause at least one of the first and second time intervals to occur at a time that deviates from the predetermined frequency to compensate for the transient.

8. The voltage regulator of claim 7, wherein the controller causes one of the first on time intervals and one of the second on time intervals to at least partially overlap in response to the detection of the transient.

9. The voltage regulator of claim 7, wherein the controller comprises:
an oscillator to generate a periodic signal;
a comparator to compare an indication of an output voltage of the switching regulator to the periodic signal; and
a control circuit coupled to the comparator to control the first and second switching regulator circuits based on the comparison.

10. The voltage regulator of claim 9, wherein the control circuit resets the oscillator in response to the detection of the transient.

11. The voltage regulator of claim 10, wherein the oscillator comprises a sawtooth oscillator.

12. The voltage regulator of claim 11, wherein the control circuit discharges a capacitor of the sawtooth oscillator in response to the detection of the transient.

13. A computer system comprising:
a switching regulator to:
monitor an output power of the regulator to detect a transient in the output power,
if the transient is not detected, store energy from an input source in an inductor of the regulator during on time intervals and transfer energy from the inductor to an output terminal of the regulator during off time intervals at a predefined frequency, and
and in response to detection of the transient, cause at least one of the on time intervals to occur at a time that deviates from the predefined frequency to compensate for the transient; and
a processor coupled to the output terminal to receive at least part of the output power.

14. The computer system of claim 13, wherein the regulator comprises:

at least one switch coupled to the inductor to cause the energy to be stored in and the energy to be transferred from the inductor;
an oscillator to generate a periodic signal;
a comparator to compare an indication of an output voltage of the regulator to the periodic signal; and
a control circuit coupled to the comparator to control said at least one switch based on the comparison.

15. The computer system of claim 14, wherein the control circuit resets the oscillator in response to the detection of the transient.

16. The computer system of claim 14, wherein the oscillator comprises a sawtooth oscillator.

17. The computer system of claim 16, wherein the control circuit discharges a capacitor of the sawtooth oscillator in response to the detection of the transient.

18. A method comprising:
energizing and de-energizing at least one inductor to furnish an output power;
monitor an indication of the output power to detect when a transient occurs in the output power;
performing the energizing and de-energizing at a predetermined frequency when the transient is not detected, and
in response to the detection of the transient, performing the energizing and de-energizing at a frequency that deviates from the predetermined frequency to compensate for the transient.

19. The method of claim 18, wherein
when the transient is not detected, the performing the energizing and de-energizing includes energizing said at least one inductor during on intervals and de-energizing said at least one inductor during off intervals, and
in response to the transient, the performing the energizing and de-energizing includes during one of the off intervals, terminating de-energization of said at least one inductor and initiating energization of said at least one inductor.

20. The method of claim 18, further comprising:
using an oscillator to furnish an oscillator signal;
referencing the energization and de-energization to an oscillator signal when the transient is not detected; and
resetting the oscillator in response to the detection of the transient.

21. The method of claim 18, further comprising:
interleaving switching phases of multiple regulators when the transient is not detected; and
aligning the switching phases when the transient is detected.

* * * * *